United States Patent [19]

Esser et al.

[11] Patent Number: 5,045,678

[45] Date of Patent: Sep. 3, 1991

[54] METHOD OF AND ARRANGEMENT FOR DETERMINING THE POSITION OF THE OPTICAL AXIS OF AN OPTICAL WAVEGUIDE

[75] Inventors: Hildegard Esser, Cologne; Michael Jechalik, Essen, both of Fed. Rep. of Germany

[73] Assignee: U.S. Philips Corp., New York, N.Y.

[21] Appl. No.: 428,266

[22] Filed: Oct. 25, 1989

[30] Foreign Application Priority Data

Oct. 29, 1988 [DE] Fed. Rep. of Germany ....... 3836954

[51] Int. Cl.$^5$ ............................ G01J 1/20; G02B 6/02
[52] U.S. Cl. ................................. 250/201.1; 385/123; 356/400; 250/227.24
[58] Field of Search ........... 250/203.3, 227.24, 227.28, 250/201.1, 201.4, 206.1, 206.2, 561, 227.11; 350/96.29, 96.15; 356/73.1, 141, 152, 400

[56] References Cited

U.S. PATENT DOCUMENTS

| | | | |
|---|---|---|---|
| 3,643,097 | 2/1972 | Ueki et al. | 350/96.29 |
| 4,117,319 | 9/1978 | White, III | 250/201.1 |
| 4,295,740 | 10/1981 | Sturges, Jr. | 250/203.3 |
| 4,452,506 | 6/1984 | Reeve et al. | 250/227.24 |
| 4,475,033 | 10/1984 | Willemsen et al. | 250/227.24 |
| 4,563,087 | 1/1986 | Bourbin et al. | 356/73.1 |
| 4,668,044 | 5/1987 | D'Auria et al. | 250/227.24 |
| 4,707,597 | 11/1987 | Schulz-Hennig et al. | 250/206.2 |
| 4,774,405 | 9/1988 | Malin | 250/201.1 |
| 4,792,676 | 12/1988 | Hojo et al. | 250/206.1 |
| 4,815,811 | 3/1989 | Crosnier et al. | 356/73.1 |

FOREIGN PATENT DOCUMENTS 0207552  1/1987  European Pat. Off. .
2082342  3/1982  United Kingdom .

Primary Examiner—David C. Nelms
Assistant Examiner—Michael Messinger
Attorney, Agent, or Firm—Ernestine C. Bartlett

[57] ABSTRACT

Method of determining the position of the optical axis of an optical waveguidde relative to a nominal axis, in which method the position of a light spot formed on a detector surface by a light beam leaving the optical waveguide is determined relative to the nominal position. A simple determination of the spatial position of an optical waveguide with respect to the angular and lateral position is possible in that the light beam is guided onto detector surfaces arranged at two different distances from the end face of the optical waveguide and in that the deviations of the light spots formed on the detector surfaces from their nominal positions are evaluated as criteria for the relative values of the angular and lateral positions of the optical waveguide.

18 Claims, 1 Drawing Sheet

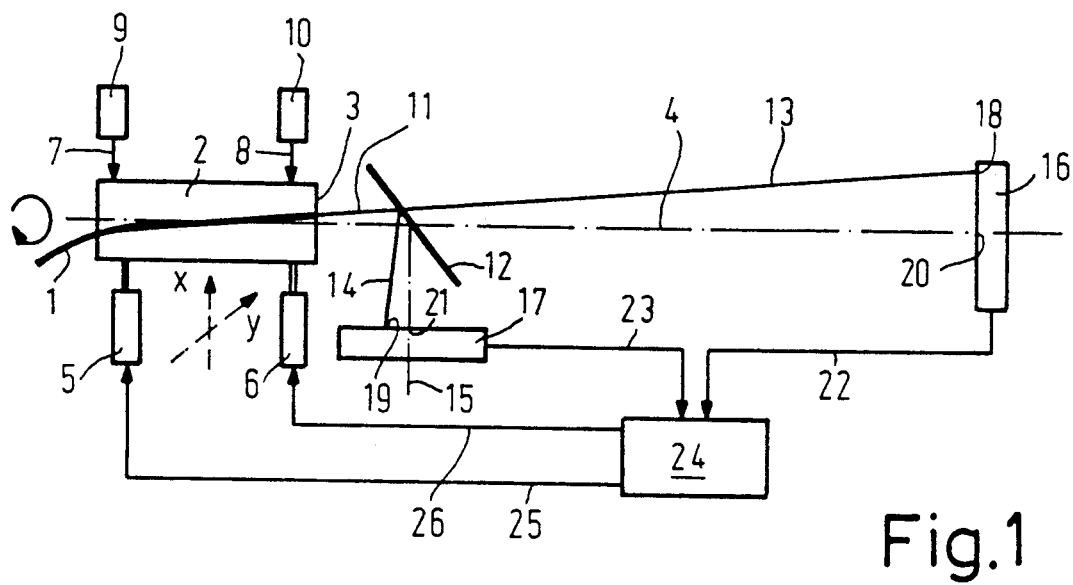
Fig.1
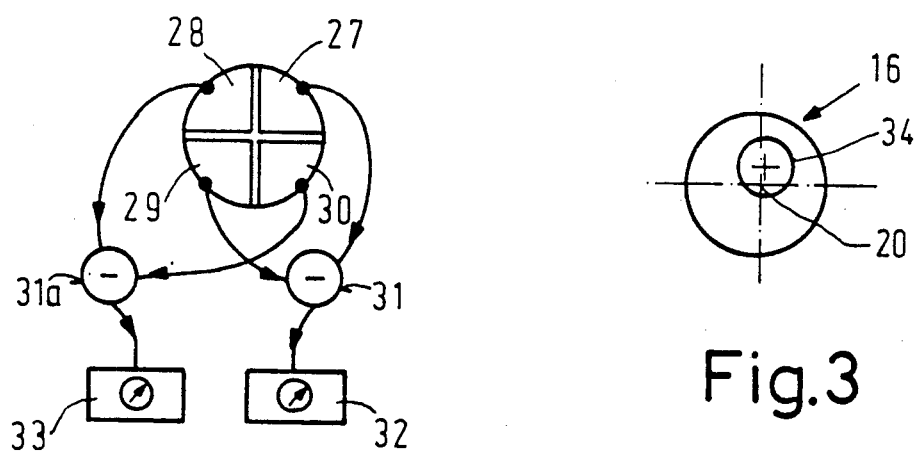
Fig.2
Fig.3

METHOD OF AND ARRANGEMENT FOR DETERMINING THE POSITION OF THE OPTICAL AXIS OF AN OPTICAL WAVEGUIDE

FIELD OF THE INVENTION

The invention relates to a method of determining the position of the optical axis of an optical waveguide relative to a nominal axis, in which the position of a light spot formed on a detector surface by a light beam leaving the optical waveguide is determined relative to the nominal position.

BACKGROUND OF THE INVENTION

The end portions of optical waveguides must be arranged, for example in plug pins concentrically to their outer cladding surface, possibly with low eccentricity and angular displacement values. It must be possible to check the actual position of the optical waveguide in a ready-made plug pin (See for example Patent application DE-A No. 38 10 057.6).

In the manufacture of plugs the concentricity of the optical waveguide can be achieved in that the plug pin is aligned in such a way that the optical axis of the optical waveguide is aligned coaxially with an axis of rotation of a clamping device, after which the outer cladding surface of the plug pin can be cut coaxially with the optical waveguide and finished (See for example EP-A No. 207 552).

A method of the type described in the opening paragraph is known from GB-A 20 82 342. In this method the angular and lateral positions of an optical waveguide are adjusted relative to an axis of a lens. While the lateral position can be detected and readjusted by means of a four-quadrant diode, the angular position must be adjusted by observing the image of the short range field of a light beam passed through the optical waveguide. Complicated optical components are required for this purpose.

SUMMARY OF THE INVENTION

An object of the invention is to perform the method of the type described in the opening paragraph, i.e., a method in which the position of a light spot formed on a detector surface by a light beam leaving the optical waveguide is determined relative to the nominal position, in such a way that the spatial position of an end portion of an optical waveguide with respect to angular and lateral positions is determined in a simple manner.

This object is realized in that the light beam is guided onto detector surfaces arranged at two different distances from the end face of the optical waveguide and in that the deviations of the light spots formed on the detector surfaces from their nominal positions are evaluated as criteria for the relative values of the angular and lateral positions of the optical waveguide.

It has been found that neither the angular position of the optical waveguide nor its eccentricity can be determined unambiguously by means of only one detector which is arranged at a given distance from the end face of the optical waveguide. In fact, the position of the light spot on a detector is dependent on the eccentricity of the end face of the optical waveguide as well as on the angular position of the end portion of the optical waveguide. A "zero" eccentricity may be, for example, determined erroneously when an actual eccentricity is superposed by such an angular displacement of the end portion of the optical waveguide that the light spot is guided onto the center of the detector.

In the solution according to the invention a light spot would appear in such a case on the detector surface arranged at the different distance, which light spot, unlike that on the first detector surface, is not located in its nominal position. The exact spatial position of the optical waveguide end portion can be determined unambiguously and, if necessary, corrected on the basis of the output signals from the two detectors.

An exactly concentric position of the optical waveguide is found when the light spots on the two detectors are in their nominal position.

In one embodiment, it is preferred that a detector is displaced towards the nominal optical axis from a first to a second distance with respect to the end face of the optical waveguide. Only one detector will be required in this case.

It two subbeams of the light beam formed by a beam splitter are guided onto one detector each, the displacement of a detector can be dispensed with.

An especially preferred embodiment of the method is characterized in that, depending on the detector output signals, adjusting movements for coaxially aligning the optical axis of the optical waveguide are generated in the nominal axis. The adjusting movements can be performed automatically by means of the output signals from the detectors.

An arrangement for performing the method according to the invention is characterized in that an optical detector for capturing the light beam can be displaced from a first distance to a second distance along the direction of the nominal optical axis and in that a device is coupled to the output of the detector for determining the difference between each actual position and the nominal position of the light spot in the coordinate directions of the detector surface from the output signal of the detector.

A preferred modification of such an arrangement is characterized in that a beam splitter is arranged in the path of the light beam for splitting the light beam into two subbeams and for guiding the subbeams onto two optical detectors arranged at different distances from the end face of the optical waveguide and in that devices are coupled to the outputs of the detectors for determining the difference between each actual position and the nominal position of the light spot in the coordinate directions of the detector surfaces. This does not require a detector which can exactly be displaced along a path of axes.

According to the invention, detectors are preferred which are four-quadrant elements (four-quadrant diodes, CCD chips) which form electric output signals of light intensities detected in four quadrants or in four directions displaced 90° with respect to each other.

For certain applications a solution is particularly suitable in which the detectors are eccentrically rotatable about the nominal axis relative to the optical waveguide. From a physical point of view it is of course unimportant whether the optical waveguide with a fixed detector or whether the detector with a fixed optical waveguide is rotated about the nominal axis.

BRIEF DESCRIPTION OF THE DRAWINGS

The invention will now be described in greater detail by way of example with reference to the accompanying drawing in which FIG. 1 shows the basic diagram of an arrangement for performing the method according to the invention, FIG. 2 shows a preferred embodiment of a detector, and FIG. 3 shows a further preferred embodiment of a detector.

DETAILED DESCRIPTION OF PREFERRED EMBODIMENTS

The arrangement shown diagrammatically in FIG. 1 is used for determining or measuring the position of an optical waveguide 1 which is fixedly connected to a plug pin 2. The optical waveguide 1 terminates at the end face 3 of the plug pin 2 with an eccentricity which should preferably be kept at a minimum, i.e. preferably exactly in the center. The optical axis of the optical waveguide 1 may be inclined with respect to the central axis of the plug pin 2.

The plug pin 2 is rotatably clamped in a rotary mount of a precision device (not shown) in which the axis of rotation and the central axis of the plug pin 2 are substantially identical. The axis of rotation corresponds to the nominal axis 4 shown in a broken line with which the optical axis of the optical waveguide 1 is to be aligned by using manipulators 5 and 6. The position of the plug pin 2 in its rotary mount can be displaced at both ends independently of each other in the x and y directions.

When the optical waveguide 1 is exactly aligned with the nominal optical axis 4 and thus also with the axis of rotation of the precision device, the outer cladding surface of the plug pin 2 has the inclination and eccentricity with respect to the axis of rotation which the optical waveguide 1 previously had relative to this outer cladding surface. By means of tracers 7 and 8 on feelers 9 and 10 engaging the ends of the plug pin 2 the positions of the circumferences at the relevant tracer positions relative to the axis of rotation can be determined when rotating the mount of the precision device. The position data of these circumferences can be used to calculate the eccentricity values and the oblique position of the optical waveguide 1. Details of this measuring method shown in a simplified form are described in Patent Application DE-A No. 38 10 057.6 referred to above.

The present invention relates to a method of determining the actual position of the optical waveguide relative to the nominal optical axis 4. To this end electromagnetic radiation, particularly light, is passed through the optical waveguide 1, which light leaves the end face of the plug pin 2 or the optical waveguide 1 as a beam 11 split up by the beam splitter 12 (for example, a semitransparent mirror) into a direct subbeam 13 and a deflected subbeam 14. If the optical waveguide is aligned with respect to the nominal optical axis 4, the direct subbeam 13 extends along the nominal optical axis 4 and the deflected subbeam 14 extends along the nominal deflection axis 15.

The optical detectors 16 and 17 form electric output signals which comprise information about the actual position of the points of impingement 18 and 19 of the subbeams 13 and 14 on the light-sensitive faces of the detectors 16 and 17, respectively, relative to the centers 20 and 21 defined by the nominal axes 4 and 15, respectively. These output signals are applied via the lines 22 and 23 to the processor 24 which applies activation signals via the lines 25 and 26 to the manipulators 5 and 6, respectively.

If the detectors are four-quadrant diodes as in FIG. 2, complete information about the aligned distances between the points 18 and 20 and 19 and 21 can be obtained without a rotation of the mount of the precision device. The light-sensitive segments 27, 28, 29 and 30 independently provide the incident electric output signals which are proportional to the light intensity. The difference between the output signals of segments diagonally facing each other (27, 29 and 28, 30) are a measure of the position coordinates of the points 18 and 19 if the centers of the four-quadrant diodes are aligned with respect to the points 20 and 21, respectively.

The beams 13 and 14 are of course incident on the detectors 16 and 17 by means of a light spot instead of a dot. The size of this light spot can be influenced by lenses inserted in the path of the beams 11 or 13 or 14.

The difference signals formed by the subtraction elements 31 and 31a can be indicated via indicator elements 32 and 33 as position coordinates of the points 18 and 19, respectively.

The detector 16 (as well as the detector 17) may alternatively be implemented as shown in FIG. 3. A detector optical waveguide 34 leading to a photodiode (not shown) is eccentrically aligned with respect to the nominal optical axis 4 and the point 20. The output signals of the photodiodes are detected for the plug pin 2 in dependence upon the angle when rotating the mount and can be evaluated for determining the position coordinates of the points of impingement 18 and 19 of the subbeams 13 and 14, respectively. Values determined in four positions displaced by 90° are sufficient for this purpose, substantially imitating the principle of the four-quadrant diode described with reference to FIG. 2.

We claim:

1. A method of determining the position of the optical axis of an optical waveguide (1) relative to a nominal axis (4), in which method the position of a light spot (18, 19) formed on detector surfaces of at least one detector (16, 17) by a light beam (11) leaving the optical waveguide (1) is determined relative to a nominal position (20, 21), wherein the light beam (11) is guided onto said detector surfaces (16, 17) arranged at two different distances from an end face of the optical waveguide (1) and the deviations of the light spots (18, 19) formed on the detector surfaces from their nominal positions (20, 21) are evaluated as criteria for the relative values of angular and lateral positions of the optical waveguide (1).

2. A method as claimed in claim 1, wherein a detector (16, 17) is displaced along the direction of the nominal optical axis (4, 15) from a first to a second distance with respect to the end face of the optical waveguide (1).

3. A method as claimed in claim 1, wherein two detectors are present and two subbeams (13, 14) of the light beam (11) formed by means of a beam splitter (12) are each guided onto a detector, the subbeam 13 being guided onto detector 16 and the subbeam 14 being guided onto detector 17, respectively.

4. A method as claimed in any one of claims 1 to 3, wherein, depending on the detector output signals, adjusting movemnts are generated for coaxially aligning the optical axis of the optical waveguide (1) with the nominal axis (4).

5. An arrangement for determining the position of the optical axis of an optical waveguide (1) relative to a nominal axis (4), with which arrangement the position of a light spot (18, 19) formed on a detector surface by a light beam leaving the optical waveguide (1) is determinable relative to a nominal position (20, 21), wherein an optical detector (16, 17) for capturing the light beam (13, 14) can be displaced from a first distance to a second distance in the direction along a nominal optical axis (4, 15) and wherein a device (24) is coupled to the output of the detector (16, 17) for determining the difference between each actual position (18, 19) and the nominal position (20, 21) of the light spot in the coordinate directions of the detector surface from the output signal of the detector.

6. An arrangement for determining the position of the optical axis of an optical waveguide (1) relative to a nominal axis (4), with which arrangement the position of a light spot (18, 19) formed on a detector surface by a light beam leaving the optical waveguide (1) is determinable relative to a nominal position (20, 21), wherein a beam splitter (12) is arranged in the path of the light beam (11) for splitting the light beam into two subbeams and for guiding the subbeams (13, 14) onto two optical detectors (16, 17) arranged at different distances from an end face of the optical waveguide and devices (24, 32, 33) are coupled to the outputs of the detectors for determining the difference between each actual position (18, 19) and the nominal position (20, 21) of the light spot in the coordinate directions of the detector surfaces.

7. An arrangement as claimed in claim 6, wherein the detectors (16, 17) are four-quadrant elements which form electric output signals of light intensities detected in four quadrants (27, 28, 29, 30).

8. An arrangement as claimed in claim 6, wherein the detectors (16, 17) are eccentrically rotatable about the nominal axis (4, 15) relative to the optical waveguide (1).

9. An arrangement as claimed in claim 7 wherein the detectors are four-quadrant diodes.

10. An arrangement as claimed in claim 5 wherein the detectors are CCD chips.

11. An arrangement as claimed in claim 5 or 6 wherein the detector (16, 17) is a four-quadrant element which forms electric output signals of light detected in four directions displaced 90° with respect to each other.

12. An arrangement as claimed in claim 11 wherein the detector is a four-quadrant diode.

13. An arrangement as claimed in claim 11 wherein the detector is a CCD chip.

14. An arrangement as claimed in claim 5 wherein the detector (16, 17) is a four-quadrant element which forms electric output signals of light intensities detected in four quadrants (27, 28, 29, 30).

15. An arrangement as claimed in claim 5 wherein the detector (16, 17) is eccentrically rotatable about the nominal axis (4, 15) relative to the optical waveguide (1).

16. An arrangement as claimed in claim 14 wherein the detector (16, 17) is a four-quadrant diode.

17. An arrangement as claimed in claim 14 wherein the detector (16, 17) is a CCD chip.

18. An arrangement as claimed in claim 6 including manipulators (5, 6) for aligning the optical axis of the optical waveguide responsive to activation signals from said device (24).

* * * * *